US011655919B2

(12) United States Patent
Muenzenberger

(10) Patent No.: US 11,655,919 B2
(45) Date of Patent: May 23, 2023

(54) FIRE PROTECTION SLEEVE

(71) Applicant: Hilti Aktiengesellschaft, Schaan (LI)

(72) Inventor: Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/468,972

(22) Filed: Sep. 8, 2021

(65) Prior Publication Data

US 2022/0003337 A1 Jan. 6, 2022

Related U.S. Application Data

(63) Continuation of application No. 16/829,035, filed on Mar. 25, 2020, now Pat. No. 11,137,091, which is a continuation of application No. 16/292,429, filed on Mar. 5, 2019, now Pat. No. 10,641,417, which is a continuation of application No. 15/568,562, filed as application No. PCT/EP2016/059344 on Apr. 27, 2016, now Pat. No. 10,415,725.

(30) Foreign Application Priority Data

Apr. 27, 2015 (EP) .................................. 15165180

(51) Int. Cl.
*F16L 5/04* (2006.01)
*A62C 2/06* (2006.01)
*H02G 3/04* (2006.01)
*H02G 3/22* (2006.01)
*A62C 3/16* (2006.01)

(52) U.S. Cl.
CPC ................ *F16L 5/04* (2013.01); *A62C 2/065* (2013.01); *A62C 3/16* (2013.01); *H02G 3/0412* (2013.01); *H02G 3/22* (2013.01)

(58) Field of Classification Search
CPC ... F16L 5/04; A62C 2/065; A62C 3/16; E04B 1/941; H02G 3/22; H02G 3/0412
See application file for complete search history.

(56) References Cited

U.S. PATENT DOCUMENTS

| 3,143,208 A | 8/1964 | Sizemore, Jr. |
| 3,369,129 A | 2/1968 | Wolterman |
| 4,109,423 A | 8/1978 | Perrain |
| 4,338,412 A | 7/1982 | von Bonin |

(Continued)

FOREIGN PATENT DOCUMENTS

| AU | B-30326/95 | 3/1996 |
| CA | 2 787 642 | 3/2013 |

(Continued)

OTHER PUBLICATIONS

Machine Translate DE9411293, Pafamax (Year: 1994).*

(Continued)

*Primary Examiner* — Babajide A Demuren
(74) *Attorney, Agent, or Firm* — Grüneberg and Myers, PLLC

(57) ABSTRACT

A firestop collar (10) for sealing of openings, especially of line penetrations (12), that pass through walls (11) or ceilings has a frame (16) and a block (20) of optionally intumescent material disposed therein, and is characterized in that an intumescent inlay (22) is disposed between the block (20) and the frame (18).

20 Claims, 2 Drawing Sheets

(56) References Cited

U.S. PATENT DOCUMENTS

| | | |
|---|---|---|
| 4,367,295 A | 1/1983 | von Bonin |
| 4,380,593 A | 4/1983 | von Bonin et al. |
| 4,460,804 A | 7/1984 | Svejkovsky |
| 4,538,389 A | 9/1985 | Heinen |
| 4,850,385 A | 7/1989 | Harbeke |
| 4,857,364 A | 8/1989 | von Bonin |
| 4,916,800 A | 4/1990 | Harbeke |
| 4,951,442 A | 8/1990 | Harbeke, Jr. |
| 5,058,341 A | 10/1991 | Harbeke, Jr. |
| 5,103,609 A | 4/1992 | Thoreson et al. |
| 5,105,592 A | 4/1992 | MacMillan et al. |
| 5,173,515 A | 12/1992 | von Bonin et al. |
| 5,309,688 A | 5/1994 | Robertson |
| 5,347,767 A | 9/1994 | Roth |
| 5,351,448 A | 10/1994 | Gohlke et al. |
| 5,390,458 A | 2/1995 | Menchetti |
| 5,452,551 A | 9/1995 | Charland et al. |
| 5,456,050 A | 10/1995 | Ward |
| 5,586,739 A | 12/1996 | Gantner et al. |
| 5,765,318 A | 6/1998 | Michelsen |
| 5,934,333 A | 8/1999 | Münzenberger et al. |
| 5,947,159 A | 9/1999 | Takahashi |
| 5,970,670 A | 10/1999 | Hoffman |
| 6,029,412 A | 2/2000 | Gohlke |
| 6,125,608 A | 10/2000 | Charlson |
| 6,172,052 B1 | 1/2001 | Cook et al. |
| 6,176,052 B1 | 1/2001 | Takahashi |
| 6,360,502 B1 | 3/2002 | Stahl, Jr. |
| 6,426,463 B2 | 7/2002 | Münzenberger et al. |
| 6,632,999 B2 | 10/2003 | Sempliner et al. |
| 6,725,615 B1 | 4/2004 | Porter |
| 6,732,481 B2 | 5/2004 | Stahl, Sr. |
| D502,147 S | 2/2005 | Stahl, Sr. |
| 6,928,777 B2 | 8/2005 | Cordts |
| 6,935,080 B2 | 8/2005 | Allwein et al. |
| 7,240,905 B1 | 7/2007 | Stahl, Sr. |
| 7,373,761 B2 | 5/2008 | Stahl, Sr. |
| 7,427,050 B2 | 9/2008 | Stahl, Sr. et al. |
| 7,478,503 B2 | 1/2009 | Milani et al. |
| 7,523,590 B2 | 4/2009 | Stahl, Sr. |
| 7,560,644 B2 | 7/2009 | Ford et al. |
| 7,596,914 B2 | 10/2009 | Stahl, Sr. et al. |
| 7,685,792 B2 | 3/2010 | Stahl, Sr. et al. |
| 7,694,474 B1 | 4/2010 | Stahl, Sr. et al. |
| 7,712,791 B1 | 5/2010 | Whitehead |
| 7,797,893 B2 | 9/2010 | Stahl, Sr. et al. |
| 7,856,775 B2 | 12/2010 | Stahl, Jr. |
| 7,867,591 B2 | 1/2011 | Sieber et al. |
| 8,051,614 B1 | 11/2011 | Peck et al. |
| D657,232 S | 4/2012 | Stahl, Sr. et al. |
| 8,188,382 B2 | 5/2012 | Monden et al. |
| 8,266,854 B2 | 9/2012 | Reddicliffe |
| 8,375,666 B2 | 2/2013 | Stahl, Jr. et al. |
| 8,393,121 B2 | 3/2013 | Beele |
| 8,397,452 B2 | 3/2013 | Stahl, Sr. et al. |
| 8,584,415 B2 | 11/2013 | Stahl, Jr. et al. |
| 8,590,231 B2 | 11/2013 | Pilz |
| 8,671,632 B2 | 3/2014 | Pilz et al. |
| 8,672,275 B2 | 3/2014 | Van Walraven et al. |
| 8,793,946 B2 | 8/2014 | Stahl, Jr. et al. |
| 8,833,478 B2 | 9/2014 | Zernach et al. |
| 8,869,475 B2 | 10/2014 | Lopes |
| 8,887,458 B2 | 11/2014 | Lopes |
| 8,910,949 B2 | 12/2014 | Åkesson |
| 8,955,275 B2 | 2/2015 | Stahl, Jr. |
| 9,046,194 B2 | 6/2015 | Gandolfo et al. |
| 9,121,527 B2 | 9/2015 | Münzenberger et al. |
| 9,157,232 B2 | 10/2015 | Stahl, Jr. |
| 9,162,093 B2 | 10/2015 | Foerg et al. |
| 9,220,932 B2 | 12/2015 | Zernach et al. |
| 9,861,843 B2 | 1/2018 | Paetow et al. |
| 2004/0030004 A1 | 2/2004 | Horacek et al. |
| 2004/0149390 A1 | 8/2004 | Monden et al. |
| 2005/0133242 A1 | 6/2005 | Kreutz |
| 2006/0037264 A1 | 2/2006 | Paetow et al. |
| 2006/0060369 A1 | 3/2006 | Hemingway et al. |
| 2006/0138251 A1 | 6/2006 | Stahl, Sr. |
| 2006/0160926 A1 | 7/2006 | Horacek et al. |
| 2007/0125018 A1 | 6/2007 | Stahl, Sr. |
| 2007/0151183 A1 | 7/2007 | Stahl, Sr. et al. |
| 2007/0175125 A1 | 8/2007 | Stahl, Sr. et al. |
| 2007/0204540 A1 | 9/2007 | Stahl, Sr. et al. |
| 2007/0261339 A1 | 11/2007 | Stahl, Sr. et al. |
| 2007/0261343 A1 | 11/2007 | Stahl, Sr. et al. |
| 2009/0126297 A1 | 5/2009 | Stahl, Jr. |
| 2010/0326678 A1 | 12/2010 | Monden et al. |
| 2011/0011019 A1 | 1/2011 | Stahl, Jr. et al. |
| 2011/0088342 A1 | 4/2011 | Stahl, Sr. et al. |
| 2011/0094759 A1 | 4/2011 | Lopes |
| 2011/0180278 A1 | 7/2011 | Magnay et al. |
| 2012/0207961 A1 | 8/2012 | Drexl et al. |
| 2012/0304979 A1 | 12/2012 | Munzenberger et al. |
| 2013/0061544 A1 | 3/2013 | Stahl, Jr. et al. |
| 2013/0086856 A1 | 4/2013 | Paetow et al. |
| 2013/0091790 A1 | 4/2013 | Stahl, Jr. et al. |
| 2013/0097948 A1 | 4/2013 | Burgess |
| 2013/0161030 A1 | 6/2013 | Münzenberger et al. |
| 2013/0205694 A1 | 8/2013 | Stahl, Jr. |
| 2013/0277918 A1 | 10/2013 | Fitzgerald et al. |
| 2013/0307225 A1 | 11/2013 | Boyd |
| 2014/0007373 A1 | 1/2014 | Münzenberger |
| 2014/0020915 A1 | 1/2014 | Lopes |
| 2014/0077043 A1 | 3/2014 | Foerg |
| 2014/0137494 A1 | 5/2014 | Stahl, Jr. et al. |
| 2014/0260015 A1 | 9/2014 | McConnell et al. |
| 2014/0360115 A1 | 12/2014 | Stahl, Jr. |
| 2015/0007515 A1 | 1/2015 | Stahl, Jr. |
| 2015/0047276 A1 | 2/2015 | Gandolfo et al. |
| 2015/0135622 A1 | 5/2015 | Muenzenberger et al. |
| 2015/0251028 A1 | 9/2015 | Klein et al. |
| 2017/0354836 A1 | 12/2017 | Lopes et al. |

FOREIGN PATENT DOCUMENTS

| | | |
|---|---|---|
| CA | 2 841 523 | 9/2014 |
| CA | 2 849 597 | 12/2014 |
| DE | 216225 | 11/1909 |
| DE | 30 25 309 A1 | 2/1982 |
| DE | 30 41 731 A1 | 6/1982 |
| DE | 33 02 416 A | 7/1984 |
| DE | 34 11 327 A1 | 10/1985 |
| DE | 39 17 518 A1 | 12/1990 |
| DE | 9411293 U1 * | 7/1994 |
| DE | 94 11 293 U1 | 9/1994 |
| DE | 196 53 503 A1 | 6/1998 |
| DE | 100 43 430 | 3/2002 |
| DE | 103 26 775 | 4/2004 |
| DE | 20 2004 004 605 | 8/2004 |
| DE | 20 2005 004 339 U1 | 10/2005 |
| DE | 20 2006 019 593 U1 | 4/2007 |
| DE | 10 2008 003 120 | 5/2009 |
| DE | 10 2010 054 621 | 6/2012 |
| DE | 10 2011 105 576 | 12/2012 |
| DE | 10 2011 089531 A1 | 6/2013 |
| DE | 20 2013 103 170 U1 | 9/2013 |
| EP | 0 043 952 A2 | 1/1982 |
| EP | 0 051 106 A1 | 5/1982 |
| EP | 0 061 024 A1 | 9/1982 |
| EP | 0 043 952 B1 | 2/1984 |
| EP | 0 116 846 A1 | 8/1984 |
| EP | 0 051 106 B1 | 3/1985 |
| EP | 0 061 024 B1 | 5/1985 |
| EP | 0 158 165 A1 | 10/1985 |
| EP | 0 116 846 B1 | 9/1987 |
| EP | 0 274 068 A2 | 7/1988 |
| EP | 0 158 165 B1 | 1/1989 |
| EP | 0 869 303 | 10/1998 |
| EP | 0 982 522 | 3/2000 |
| EP | 0 988 873 | 3/2000 |
| EP | 1 347 549 A1 | 9/2003 |
| EP | 1 641 895 B1 | 6/2009 |
| EP | 2 273 639 | 1/2011 |
| EP | 2 339 708 | 6/2011 |
| EP | 2 455 135 A2 | 5/2012 |

(56) References Cited

FOREIGN PATENT DOCUMENTS

| | | |
|---|---|---|
| ES | 2 312 276 | 2/2009 |
| GB | 2 111 624 | 7/1983 |
| GB | 2 216 220 | 10/1989 |
| GB | 2 233 725 | 1/1991 |
| GB | 2 281 859 | 3/1995 |
| GB | 2 334 770 | 9/1999 |
| GB | 2 444 400 | 6/2008 |
| GB | 2 457 152 | 8/2009 |
| IE | 902358 | 6/1991 |
| JP | 2-286990 | 11/1999 |
| JP | 2000-240854 | 9/2000 |
| JP | 2008-121413 | 5/2008 |
| JP | 2012-92644 | 5/2012 |
| JP | 2014-148998 | 8/2014 |
| JP | 2014-212617 | 11/2014 |
| JP | 2015-057560 | 3/2015 |
| NL | 8700459 | 9/1988 |
| RU | 2 297 500 | 4/2007 |
| WO | 1991/019540 A1 | 12/1991 |
| WO | 97/04838 | 2/1997 |
| WO | 97/08485 | 3/1997 |
| WO | 99/58199 | 11/1999 |
| WO | 2002/037011 | 5/2002 |
| WO | 2004/015319 | 2/2004 |
| WO | 2007/061572 | 5/2007 |
| WO | 2008/140399 | 11/2008 |
| WO | 2013/160776 | 10/2013 |
| WO | 2014/071362 | 5/2014 |
| WO | 2014/081446 | 5/2014 |
| WO | 2015/023313 | 2/2015 |
| WO | 2015/055855 | 4/2015 |
| WO | 2016/089290 | 6/2016 |

OTHER PUBLICATIONS

International Search Report for PCT/EP2017/059344, dated Jul. 14, 2016, with English translation.
Written Opinion of the International Searching Authority for PCT/EP2016/059344, dated Jul. 14, 2016, with English translation.
International Preliminary Report on Patentability dated Oct. 31, 2017.
Document 1, filed Sep. 22, 2022, "Complaint for Patent Infringement" in Case 1:22-cv-01248-CFC (in the U.S. District Court for the District of Delaware).
Exhibit 1 to Document 1, filed Sep. 22, 2022, "Complaint for Patent Infringement" in Case 1:22-cv-01248-CFC (in the U.S. District Court for the District of Delaware).
Exhibit 2 to Document 1, filed Sep. 22, 2022, "Complaint for Patent Infringement" in Case 1:22-cv-01248-CFC (in the U.S. District Court for the District of Delaware).
Exhibit 3 to Document 1, filed Sep. 22, 2022, "Complaint for Patent Infringement" in Case 1:22-cv-01248-CFC (in the U.S. District Court for the District of Delaware).
Exhibit 4 to Documemt 1, filed Sep. 22, 2022, "Complaint for Patent Infringement" in Case 1:22-cv-01248-CFC (in the U.S. District Court for the District of Delaware).
Exhibit 5 to Document 1, filed Sep. 22, 2022, "Complaint for Patent Infringement" in Case 1:22-cv-01248-CFC (in the U.S. District Court for the District of Delaware).
Exhibit 6 to Document 1, filed Sep. 22, 2022, "Complaint for Patent Infringement" in Case 1:22-cv-01248-CFC (in the U.S. District Court for the District of Delaware).
Exhibit 7 to Document 1, filed Sep. 22, 2022, "Complaint for Patent Infringement" in Case 1:22-cv-01248-CFC (in the U.S. District Court for the District of Delaware).
Exhibit 8 to Document 1, filed Sep. 22, 2022, "Complaint for Patent Infringement" in Case 1:22-cv-01248-CFC (in the U.S. District Court for the District of Delaware).
Exhibit 9 to Document 1, filed Sep. 22, 2022, "Complaint for Patent Infringement" in Case 1:22-cv-01248-CFC (in the U.S. District Court for the District of Delaware).
Exhibit 10 to Document 1, filed Sep. 22, 2022, "Complaint for Patent Infringement" in Case 1:22-cv-01248-CFC (in the U.S. District Court for the District of Delaware).
Exhibit 11 to Document 1, filed Sep. 22, 2022, "Complaint for Patent Infringement" in Case 1:22-cv-01248-CFC (in the U.S. District Court for the District of Delaware).
Exhibit 12 to Document 1, filed Sep. 22, 2022, "Complaint for Patent Infringement" in Case 1:22-cv-01248-CFC (in the U.S. District Court for the District of Delaware).
Exhibit 13 to Document 1, filed Sep. 22, 2022, "Complaint for Patent Infringement" in Case 1:22-cv-01248-CFC (in the U.S. District Court for the District of Delaware).
Exhibit 14 to Document 1, filed Sep. 22, 2022, "Complaint for Patent Infringement" in Case 1:22-cv-01248-CFC (in the U.S. District Court for the District of Delaware).
Exhibit 15 to Document 1, filed Sep. 22, 2022, "Complaint for Patent Infringement" in Case 1:22-cv-01248-CFC (in the U.S. District Court for the District of Delaware).
Exhibit 16 to Document 1, filed Sep. 22, 2022, "Complaint for Patent Infringement" in Case 1:22-cv-01248-CFC (in the U.S. District Court for the District of Delaware).
Exhibit 17 to Document 1, filed Sep. 22, 2022, "Complaint for Patent Infringement" in Case 1:22-cv-01248-CFC (in the U.S. District Court for the District of Delaware).
Exhibit 18 to Document 1, filed Sep. 22, 2022, "Complaint for Patent Infringement" in Case 1:22-cv-01248-CFC (in the U.S. District Court for the District of Delaware).
Exhibit 19 to Document 1, filed Sep. 22, 2022, "Complaint for Patent Infringement" in Case 1:22-cv-01248-CFC (in the U.S. District Court for the District of Delaware).
Exhibit 20 to Document 1, filed Sep. 22, 2022, "Complaint for Patent Infringement" in Case 1:22-cv-01248-CFC (in the U.S. District Court for the District of Delaware).
Exhibit 21 to Document 1, filed Sep. 22, 2022, "Complaint for Patent Infringement" in Case 1:22-cv-01248-CFC (in the U.S. District Court for the District of Delaware).
Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 1 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 2 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 3 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 4 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 5 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 6 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 7 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 8 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).

(56) References Cited

OTHER PUBLICATIONS

Exhibit 9 to Document 13, filed Nov. 21, 2022, "Specified Technologies. Inc.'s Answer to Complaint for Patent Infringement, Defenses, and Counterclaims" in Case 1:22-cv-01248-CFC in the U.S. District Court for the District of Delaware.
Exhibit 10 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 11 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 12 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 13 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 14 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 15 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 16 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 17 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 18 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 19 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 20 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 21 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 22 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 23 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 24 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 25 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 26 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 27 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 28 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 29 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 30 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 31 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 32 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 33 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 34 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 35 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 36 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 37 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 38 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 39 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 40 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 41 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 42 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).
Exhibit 43 to Document 13, filed Nov. 21, 2022, "Specified Technologies, Inc.'s Answer to Complaint for Patent Infringement, Defenses, and Counterclaims"in Case 1:22-cv-01248-CFC (in the U.S. District Court for the District of Delaware).

(56) References Cited

OTHER PUBLICATIONS

Exhibit 44 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).

Exhibit 45 to Document 13, filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).

* cited by examiner

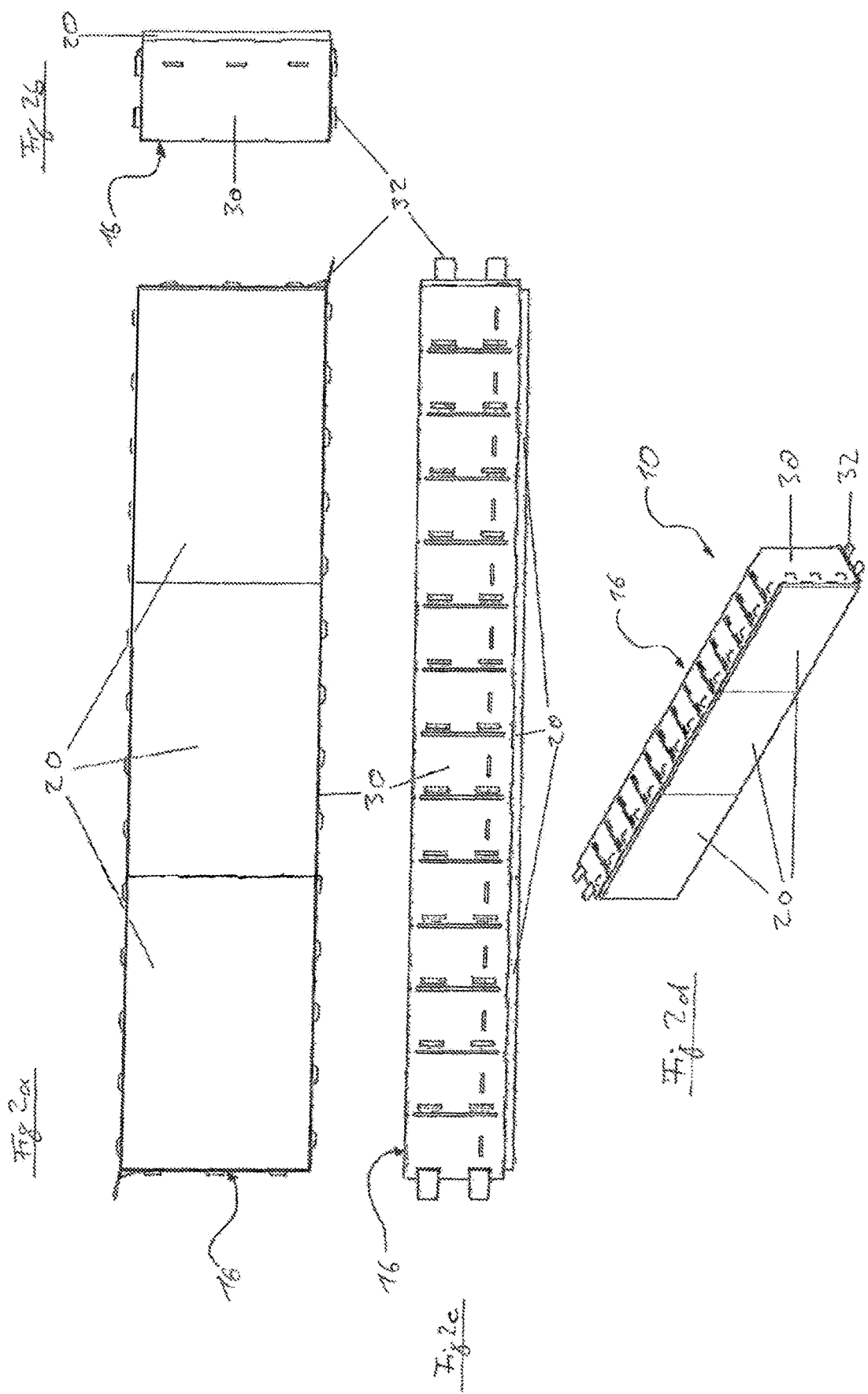

FIRE PROTECTION SLEEVE

CROSS-REFERENCE TO RELATED APPLICATIONS

This application is a Continuation of Ser. No. 16/829,035, filed on Mar. 25, 2020, which is a Continuation of Ser. No. 16/292,429, filed on Mar. 5, 2019, which is a Continuation of Ser. No. 15/568,562, filed Oct. 23, 2017, which is a National Stage entry under § 371 of International Application No. PCT/EP2016/059344, filed on Apr. 27, 2016 and which claims the benefit of European Application No. 15165180.9, filed on Apr. 27, 2015. The content of each of these applications is hereby incorporated by reference in its entirety.

BACKGROUND OF THE INVENTION

Field of the Invention

The invention relates to a firestop collar for sealing of openings, especially of line penetrations, that pass through walls or ceilings, with a frame and a block of optionally intumescent material disposed therein.

Description of Related Art

Firestop collars, which are capable of sealing line penetrations of non-fire-resistant pipes or cables in ceilings or walls in the event of fire, in order to prevent the spread of fire and smoke in buildings, are known in the most diverse configurations. The firestop collars usually contain an intumescent material, which is disposed around the lines, and a frame of sheet metal, which jackets the intumescent material and serves to fasten the intumescent material to walls or ceilings. The firestop collars are usually attached around the penetrating lines upstream from the openings, since mounting is simpler there.

As an example, DE 10 2011 089 531 A1 discloses a firestop collar of the type mentioned in the introduction, consisting of a block of intumescent material and a frame surrounding this.

EP 2 455 135 A2 teaches a fire-protection element which, in addition to the intumescent material, has a reinforcing inlay, which stabilizes the ash layer formed in the event of fire.

SUMMARY OF THE INVENTION

A disadvantage of the known firestop collars is that they are suitable only for small opening cross sections, because in the case of large cross sections the fire-protection element becomes unstable and the ash crust is able to fall out of the frame. This leads to much poorer fire-protection properties and therefore makes known firestop collars unsuitable for large opening cross sections. The object of the invention is to provide a firestop collar that ensures reliable fire protection even in the case of larger opening cross sections.

To solve this object, it is provided, in a firestop collar of the type mentioned in the introduction, that an intumescent inlay is disposed between block and the frame.

BRIEF DESCRIPTION OF THE DRAWINGS

FIG. 2a shows a top view, in the direction of the face bearing on the wall, of a firestop collar with a frame of modular construction according to a second embodiment of the invention.

FIG. 2b shows a first side view of the second embodiment of the inventive firestop collar.

FIG. 2c shows a second side view of the second embodiment of the inventive firestop collar.

FIG. 2d shows a perspective view of the second embodiment of the inventive firestop collar.

DETAILED DESCRIPTION OF THE INVENTION

Figure 1:
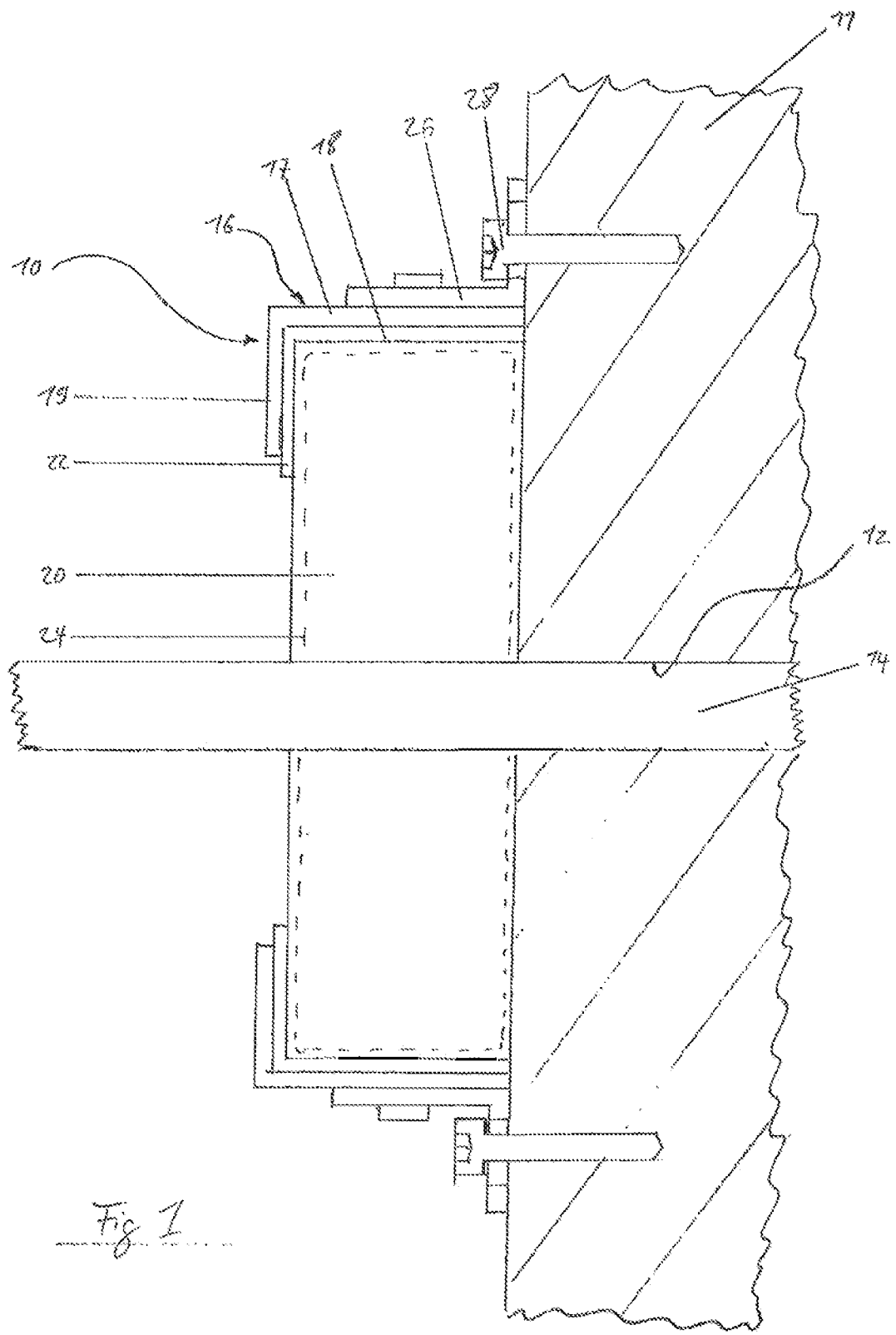
FIG. 1 shows a sectional view of a first embodiment of the inventive firestop collar, which has been attached upstream from a line penetration.

In the event of fire, the heat causes the intumescent inlay to be activated and to expand. Preferably the block consists of intumescent material, so that, by using, for the intumescent inlay and the block of optionally intumescent material, various intumescent materials with different properties, for example with respect to activation temperature and expansion behavior, the pressure variations can be adapted in such a way over the duration of the fire that the stability of the resulting ash crust of the optionally intumescent block is improved. These features make it possible to cover much larger opening cross sections with this firestop collar, without causing the stability problems known from the prior art to occur. In particular, opening sizes ranging from 100 mm×300 mm up to 150 mm×750 mm can be sealed with the inventive firestop collar.

The frame of the firestop collar may have a plurality of side portions that surround the block of optionally intumescent material on its side rims, as well as a plurality of front portions extending perpendicularly relative to the side portions. This configuration of the frame ensures that the block of optionally intumescent material is securely fastened and in the event of fire expands directionally, in order to bring its fire-protection properties optimally into effect.

The height of the block of optionally intumescent material is preferably slightly greater than the height of the side portions. Hereby the firestop collar has a projecting length of optionally intumescent materiel on the wall side, and so this is pressed with preload against the surface of the wall or ceiling during mounting. Preferably, this projecting length is 2 mm to 6 mm, which leads to an optimum contact pressure effect.

In a preferred embodiment, the intumescent inner liner extends along at least one of the side portions. Alternatively, the intumescent inlay may also extend additionally, even along the front portion allocated to the side portion. Due to this configuration, the active forces that the intumescent inlay exerts on the block of optionally intumescent material are advantageously directed, namely toward the interior and toward the wall or ceiling.

In one embodiment, the block consists of a foamable material. Hereby sound absorption is also ensured in addition to imperviousness to smoke gas. In one preferred embodiment, the block consists of a foamable binding agent which contains at least one ash-forming and optionally intumescent mixture. This binding agent acts as a composite-forming carrier for the ash-forming and optionally intumescent mixture. Preferably, the mixture is distributed homogeneously in the binding agent. The composite-forming carrier is preferably chosen from the group consisting of polyurethanes, phenol resins, polystyrenes, polyolefins such as polyethylene and/or polybutylene, melamine resins, melamine resin foams, synthetic or natural rubber, cellulose, elastomers and mixtures thereof, wherein polyurethanes are preferred.

The ash-forming and optionally intumescent mixture comprises the fire-protection additives that are common and known to the person skilled in the art and that foam up in the event of fire, i.e. under the effect of heat, and while doing so form a foam, such as an intumescent material on the basis of an acid-forming agent, a carbon-producing compound and a blowing agent, that prevents the spread of flames.

Preferably the intumescent material comprises, as acid-forming agent, a salt or an ester of an inorganic, nonvolatile acid chosen from among sulfuric acid, phosphoric acid and boric acid, as carbon-producing compound, a polyhydroxy compound and/or a thermoplastic or thermosetting polymeric resin binding agent, and, as blowing agent, a chloroparaffin, melamine, a melamine compound, especially melamine cyanurate, melamine phosphate, melamine polyphosphate, tris(hydroxyethyl)cyanyrate, cyanamide, dicyanamide, dicyandiamide, biguanidine and/or a guanidine salt, especially guanidine phosphate or guanidine sulfate.

The composite-forming carrier may further contain, as ablative additive, an inorganic compound, which has incorporated water, e.g. as water of crystallization, and does not dry out at temperatures up to 100° C. but releases the water starting at 120° C. in the event of fire and thereby is able to cool temperature-conducting parts, wherein the said compound is preferably an inorganic hydroxide or hydrate, especially aluminum hydroxide, aluminum oxide hydrates or partly hydrated aluminum hydroxides, which release water at fire temperature or when exposed to flames. Other inorganic hydroxides or hydrates that release water when exposed to flames may also be considered, however, such as are described in EP 0 274 068 A2.

Such compounds, which may be used as the mixture in the inventive fire-protection inlay, are known to the person skilled in the art and, for example, are disclosed in the following publications, to which reference is expressly made herewith: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 158 165 B1, EP 0 274 068 A2, EP 1 347 549 A1, EP 1 641 895 B1 and DE 196 53 503 A1.

The molded block is produced by foam molding, such as reaction injection molding (RIM) with foam, corresponding to DE 3917518, e.g. with Fomax® fire-protection foam or with HILTI CP 65GN, a construction material that forms an insulating layer. Materials that can be used for inventive purposes are known from EP 0061024 A1, EP 0051106 A1, EP 0043952 A1, EP 9153165 A1, EP 0116846 A1 and U.S. Pat. No. 3,396,129 A as well as EP 1347549 A1. Preferably, the molded block consists of an intumescent-capable polyurethane foam, such as is known from EP 0061024 A1, DE 3025309 A1, DE 3041731 A1, DE 3302416 A and DE 3411 327 A1.

The block of optionally intumescent material is preferably provided with a reinforcing inlay. This reinforcing inlay serves for stabilization of the intumescent crust formed in the event of fire, and it helps to prevent parts of this from falling out of the firestop collar. For this purpose, it is advantageous to position the reinforcing inlay in the surface of the block of optionally intumescent material, in order to stabilize the outer faces.

The reinforcing inlay is preferably formed by a mat, a mesh or a fabric. Such a construction offers good penetration of the block of optionally intumescent material, and the reinforcing inlay retains its stabilizing properties even if structural damage is sporadically present.

In a preferred embodiment, the reinforcing inlay consists of a temperature-resistant material, for example metal, glass fibers, basalt fibers, carbon fibers or ceramic fibers. A hybrid structure comprising several materials in the reinforcing inlay is also possible. The higher temperature resistance compared with the intumescent material is advantageous, since the reinforcing inlay is not impaired by the temperature that activates the intumescent material and so is able to exert its stabilizing function in this way.

In a further preferred embodiment, the reinforcing inlay consists of expanded metal. This is advantageous with respect to the stabilizing effect.

The firestop collar is preferably fastened by means of a plurality of fastening brackets on its side portions. These permit secure fastening of the firestop collar to walls and ceilings and, for example, they can be joined to the side portions via plug-type means. For fastening, the firestop collar may be placed directly on the wall. An additional frame is not necessary, nor is double framing. It is also possible to mount the firestop collar directly over an already present firewall, so that it acts as a repair wall.

In a preferred embodiment, the block of optionally intumescent material of the firestop collar is a molded part and is inserted in one or more pieces into the frame and is built-in together therewith. The molded parts may have any desired shape, but are preferably regular polyhedra, for example cuboids. This has the advantage that the number of blocks used for the firestop collar can be matched easily to the opening to be sealed. The reduction of the molded parts to a few modular common parts offers further advantages beyond this from the logistical and economic perspective.

In an alternative embodiment, the firestop collar is formed by first mounting the frame and then introducing the block of optionally intumescent material by means of a foam material with optionally intumescent properties, wherein the foam material is a foamable material, such as an in-situ foam, for example, that is introduced into the frame and then fills it by foaming up. The advantage of this approach is that only the foam material instead of molded parts has to be kept in readiness, and an individually adapted block of optionally intumescent material is obtained automatically by foaming the frame in place.

In a preferred embodiment, the frame of the firestop collar is of modular construction. This means in particular that this is constructed from a few common parts and can be configured to diverse ways. This has the advantage that the frame can be adapted individually in place to the opening cross section and that efficient use of material is possible. In addition, a reduction of the parts from which the frame is constructed to a few modular common parts offers further advantages beyond this from the logistical and economic perspective.

Preferably, the frame of the firestop collar consists of a plurality of individual parts, which are joined to one another by a plug-type connector. Thus, when the frame is dismantled into individual parts, it may be transported in compact form and mounted simply by the plug-type connectors.

In a further embodiment, the frame of the firestop collar is formed from one continuous strip, which is cut to the desired length and the end of which is joined to its beginning. In this way, the frame can be adapted individually to various opening cross sections.

Further advantages and features will become obvious from the description hereinafter in conjunction with the attached drawings, wherein:

FIG. 1 shows a sectional view of a first embodiment of the inventive firestop collar, which has been attached upstream from a line penetration, FIG. 2a shows, in a top view in the direction of the face bearing on the wall, a firestop collar with a frame of modular construction according to a second embodiment of the invention, FIG. 2b shows a first side view, FIG. 2c shows a second side view, and FIG. 2d shows a perspective view of the second embodiment of the inventive firestop collar.

FIG. 1 shows a first embodiment of a firestop collar 10, which is attached at an opening, e.g. in a wall 11, upstream from a line penetration 12 of a line 14. The firestop collar contains a frame 16, a block 20 of optionally intumescent material located therein and an intumescent inlay 22 disposed therebetween, and is joined to wall 11 via fastening brackets 26. As an example, line 14 is a water pipe of plastic or contains one or more cables.

Frame 16 has a plurality of side portions 17, which surround block 20 on its side rims 18 and relative to which a plurality of front portions 19 extends perpendicularly. On the side facing away from block 20, a plurality of fastening brackets 26 is provided on these side portions 17.

Block 20 has a reinforcing inlay 24, which preferably is integrated into the outer surface of block 20. The reinforcing inlay 24 may be formed by a mat, a mesh or a fabric.

Preferably, reinforcing inlay 24 consists of particularly temperature-resistant material, such as metal, glass fibers, basalt fibers, carbon fibers, ceramic fibers or a hybrid material, for example.

Alternatively, expanded metal may be used for reinforcing inlay 24.

Block 20 may be provided as a molded part, for example in the form of a cuboid. In this case, block 20 is preferably slightly larger than frame 16 surrounding it, in order to guarantee secure seating of block 20 in frame 16. In particular, block 20 is 2 mm to 6 mm higher than side portions 17, and, by virtue of this projecting length toward the wall side, it may be mounted in such a way on wall 11 that the intumescent material is pressed with preload against the surface.

Alternatively, block 20 may also be formed by a foam material introduced into frame 16. For this purpose, frame 16 including intumescent inlay 22 is first fastened upstream from line penetration 12 and then the space surrounded by frame 16 is filled by injection molding with an intumescent foam material. Depending on configuration, reinforcing inlay 24 may be introduced at various points in time.

Intumescent inlay 22 is fixed between frame 16 and block 20 and extends along side portions 17 and the respective front portions 19.

Fastening brackets 26, which consist of angled sheet-metal, for example, are joined on the outside of frame 16 to side portions 17. As an example, this joint may be made in the term of a plug-type connector by means of brackets or else via additional fastening elements, such as screws or rivets.

By means of fasteners 28, firestop collar 10 can be fastened to wall 11 via fastening brackets 26 attached to side portions 17. For example, by the fact that screws are used as fasteners 26, the preload of firestop collar 10 cm be adjusted by tightening these.

FIGS. 2a to 2d show a second embodiment of a firestop collar 10 in various views, wherein frame 16 is of modular construction and preferably consists of a plurality of individual parts 30, which are joined to one another by plug type connectors 32.

In the illustrated variant, firestop collar 10 consists of three rectangular blocks 20 of optionally intumescent material and one frame 16 of two L-shaped individual parts 30. These L-shaped individual parts 30 may also be straight strips, which in particular were bent in place at right angles, in order to form a frame 16 adapted to the opening cross section.

In one embodiment (not illustrated), frame 16 is formed from one continuous strip, which is cut to the desired length and joined at its ends.

In one embodiment (not illustrated), firestop collar 10 consists of at least two parts, wherein only one part, especially one half, may also be used as a fully effective firestop collar 10.

In particular, firestop collar 10 is dimensioned such that fire-resistance class EI 120 is achieved even for walls with a thickness of 100 mm.

In the marketplace, moreover, it is possible to offer firestop collar 10 not only as a complete set but also as individual parts thereof. In particular, frame 16 and block 20 of optionally intumescent material may be sold individually.

The invention claimed is:

1. A firestop apparatus, comprising:
a frame with an open front end and an open rear end;
a block disposed within the frame between the open front end and the open rear end, the block having a first thickness and being made of a first material comprising a first passageway extending between the open front end and the open rear end; and
an inlay disposed between the open front end of the frame and a front surface of the block, the inlay comprising a second passageway aligned with the first passageway of the block and being made from a second material of a second thickness different from the first thickness, wherein the first passageway and the second passageway are occupied by at least one line in an installed state that allows the at least one line to pass through the open front end and the open rear end of the frame, wherein the open front end of the frame has an opening of a first size, and wherein the first passageway has a second size different from the first size.

2. The firestop apparatus of claim 1, wherein the first thickness is greater than the second thickness.

3. The firestop apparatus of claim 1, wherein the first material is different from the second material.

4. The firestop apparatus of claim 1, wherein the first material of the block comprises a fire-resistant material.

5. The firestop apparatus of claim 4, wherein the fire-resistant material comprises an intumescent material which expands into at least the first passageway when exposed to heat.

6. The firestop apparatus of claim 1, wherein:
the open front end of the frame is in a first plane,
a front surface of the block is in a second plane, and
the first plane is substantially parallel to the second plane.

7. The firestop apparatus of claim 1, wherein:
the open rear end of the frame is in a first plane,
a rear surface of the block is in a second plane, and
the first plane is substantially parallel to the second plane.

8. The firestop apparatus of claim 1, wherein:
the block is in a first plane,
the inlay is in a second plane, the open rear end of the frame is in a third plane, and
the first plane, the second plane, and the third plane are substantially parallel to one another.

9. The firestop apparatus of claim 1, further comprising:
a fastener bracket configured to couple the frame to a mounting surface.

10. The firestop apparatus of claim 9, wherein the fastener bracket is coupled to a side surface of the frame.

11. The firestop apparatus of claim 1, wherein the frame comprises a rigid material.

12. The firestop apparatus of claim 1, wherein the block is in contact with the inlay in at least the installed state.

13. The firestop apparatus of claim 1, wherein the frame comprises a modular construction.

14. A firestop apparatus, comprising:
a frame with an open front end and an open rear end;
a block disposed within the frame between the open front end and the open rear end, the block having a first thickness and being made of a first material comprising a first passageway extending between the open front end and the open rear end; and
an inlay disposed between the open front end of the frame and a front surface of the block, the inlay comprising a second passageway aligned with the first passageway of the block and being made from a second material of a second thickness different from the first thickness, wherein the first passageway and the second passageway are occupied by at least one line in an installed state that allows the at least one line to pass through the open front end and the open rear end of the frame, and wherein the inlay is exposed to view through the open front end of the frame in the installed state.

15. The firestop apparatus of claim 14, wherein the first thickness is greater than the second thickness.

16. The firestop apparatus of claim 14, wherein the first material of the block comprises an intumescent material which expands into at least the first passageway when exposed to heat.

17. The firestop apparatus of claim 14, wherein:
the block is in a first plane,
the inlay is in a second plane,
the open rear end of the frame is in a third plane, and
the first plane, the second plane, and the third plane are substantially parallel to one another.

18. The firestop apparatus of claim 14, wherein:
the open front end of the frame has an opening of a first size, and
the first passageway has a second size different from the first size.

19. The firestop apparatus of claim 14, further comprising:
a fastener bracket configured to couple the frame to a mounting surface, wherein the fastener bracket is coupled to a side surface of the frame.

20. The firestop apparatus of claim 14, wherein the frame comprises a rigid material.

* * * * *